United States Patent

[11] 3,610,905

[72] Inventors Edwin W. Herron
Phoenix, Ariz.;
Robert D. Hunter, Wayland, Mass.; David E. Keefer, Scottsdale, Ariz.

[21] Appl. No. 448,539
[22] Filed Apr. 15, 1965
[45] Patented Oct. 5, 1971
[73] Assignee Honeywell Information Systems Inc.

[54] DIVISION SYSTEM GENERATING A VARIABLE LENGTH QUOTIENT IN WHICH THE UNIT OF INFORMATION EXCEEDS THE CAPACITY OF THE OPERATING REGISTERS
7 Claims, 2 Drawing Figs.

[52] U.S. Cl. .......... 235/159
[51] Int. Cl. .......... G06f 7/52
[50] Field of Search .......... 235/156, 159, 160, 164

[56] References Cited

UNITED STATES PATENTS

| | | | |
|---|---|---|---|
| 3,257,548 | 6/1966 | Fleisher et al. | 235/164 |
| 3,028,086 | 4/1962 | Sierra | 235/160 |

OTHER REFERENCES

J. Tai, Divide Circuit, Dec. 1959 pp. 48–51
H. M. Sierra, Division System, April 1960 p. 105

*Primary Examiner*—Malcolm A. Morrison
*Assistant Examiner*—David H. Malzahn
*Attorneys*—George V. Eltgroth, Howard M. Dustin, Ronald W. O'Keefe, Melvin M. Goldenberg, Frank L. Neuhauser and Oscar B. Waddell

ABSTRACT: Division apparatus in a data processing system includes the selection of a number of quotient characters to be formed and employs operating registers of the data processing system. The most significant characters of the dividend and the divisor are used to develop a trial quotient and the trial quotient is used with the rest of the characters to obtain the actual quotient and remainder.

DATA PROCESSING SYSTEM

INVENTORS.

EDWIN W. HERRON
ROBERT D. HUNTER
DAVID E. KEEFER

BY [signature]

ATTORNEY

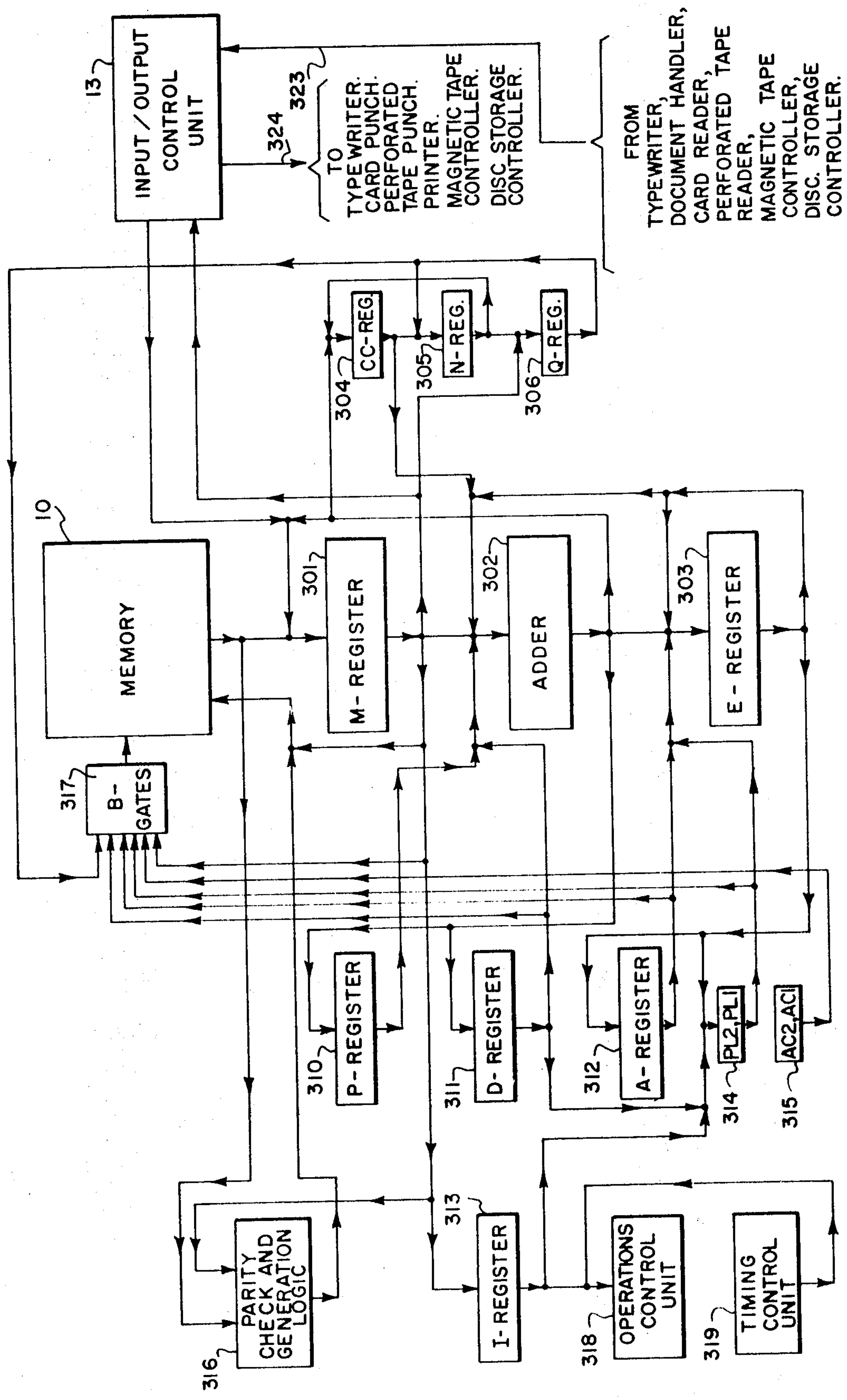
FIG. 12 SYSTEM DATA TRANSFER

DIVISION SYSTEM GENERATING A VARIABLE LENGTH QUOTIENT IN WHICH THE UNIT OF INFORMATION EXCEEDS THE CAPACITY OF THE OPERATING REGISTERS

This invention relates to data processing systems and, in particular, to apparatus for performing the arithmetic operation of division in data processing systems.

Arithmetic operations in a data processing system include the operations of addition, subtraction, multiplication and division. Division is normally accomplished in the arithmetic unit of a data processing system by performing a sequence of successive subtractions and shifts to obtain the quotient. For example, in decimal division, the divisor is normally subtracted from the most significant portion of the dividend until a negative remainder occurs. The number of times the subtraction occurs, less the subtraction producing the negative remainder, provides the most significant quotient character. The negative remainder is corrected by adding the divisor and the corrected remainder is shifted left one character position. The same procedure is automatically repeated to develop the remaining quotient characters and the final remainder.

In the arithmetic units of prior art data processing systems, provision is normally made for the development of a quotient from a dividend having a fixed number of characters or binary digits and a divisor having a fixed number of characters or binary digits. For example, a prior art arithmetic unit may be designed to automatically divide a 16-character dividend by an eight-character divisor to form a quotient having eight characters. No provision is made for controlling the number of quotient characters developed during the division operation. Although the relative magnitudes of the dividend and divisor may be arranged so that the quotient has a predetermined number of significant characters with the remaining characters of the quotient being zeros, the arithmetic unit still performs the full division operation. Such an arrangement is wasteful of time and does not most efficiently employ the capabilities of the data processing system. Accordingly, it is desirable to provide an arithmetic unit for performing division of a dividend by a divisor which permits greater flexibility and more efficiently employs the capabilities of the arithmetic unit.

In prior art data processing systems, it has been necessary, in performing a division operation, to manipulate the entire divisor and a dividend at least as large as the divisor. Consequently, registers of sufficient size and storage capacity to temporarily store the full divisor and a dividend having an equal or greater number of characters or binary digits have been provided. In data processing systems where it is desirable to perform division operations employing large units of information, for example, units of information comprising several words, the size of the required registers increases significantly the cost and complexity of the data processing system. Accordingly, it is desirable to provide an arrangement for performing a division operation in data processing systems which does not require large operating registers, even though the units of information involved in the division operation are large.

It is therefore an object of this invention to provide an improved arrangement for performing division in the arithmetic unit of a data processing system.

It is another object of the invention to provide improved apparatus for performing division in a data processing system which more efficiently employs the capabilities of the data processing system.

It is another object of the invention to provide apparatus for performing division operations in a data processing system which permits greater flexibility in selection of the number of quotient digits to be formed during the operation.

It is a further object of the invention to provide apparatus for performing division operations in a data processing system which permits formation of a quotient having a variable number of characters.

It is a further object of the invention to provide apparatus for performing division operations in a data processing system which permits the operating registers of the system to be employed even though the divisor contains a number of characters or binary digits greater than the capacity of the operating registers.

The foregoing objects are achieved, in the illustrated embodiment of the invention, by employing the E- and M-Registers, which are four-character operating registers of the arithmetic unit, in conjunction with the adder of the arithmetic unit and the 16-character accumulator in memory. The CC-, N- and Q-Registers of the arithmetic unit are employed to temporarily store quotient characters, borrow counts and subtraction counts during the division operation. Initially, in response to a predetermined operation code in the I-Register, the contents of the accumulator are shifted left one character position with the character shifted out of the accumulator being stored for use as the most significant dividend character. The remaining dividend characters are contained in the eight most significant character positions of the accumulator. The most significant divisor word of the two-word divisor is repeatedly subtracted from the most significant dividend word in the adder, with borrows being subtracted from the most significant dividend character. The subtraction process is terminated when the most significant dividend character is reduced to zero and a borrow occurs. The most significant remainder word and the count of the number of subtractions performed, which comprises the trial quotient, are then stored in the accumulator and Q-Register respectively.

The least significant divisor word is next repeatedly subtracted in the adder from the least significant dividend word a number of times equal to the value of the trial quotient, the borrows generated during the subtraction operations being accumulated in the CC-Register. The least significant remainder word is stored in the accumulator and the accumulated borrow count in the CC-Register is subtracted from the most significant remainder word to form a modified most significant remainder word which is stored in the accumulator. If flip-flop CRE is set to the 1-state, indicating a carry during this subtraction, the modified most significant remainder word and the least significant remainder word comprise the final remainder and the trial quotient is the final quotient. The final remainder is stored in the eight most significant character positions of the accumulator and the final quotient is stored in the least significant character position of the accumulator.

If flip-flop CRE is reset to the 0-state, indicating that the borrow count was greater than the most significant remainder word, the trial quotient is reduced by one to form the corrected and final quotient and stored in the least significant character position of the accumulator. The least significant and most significant divisor words are added in the adder to the least significant and most significant remainder words respectively to form the corrected remainder which is stored in the eight most significant character positions of the accumulator. Control of the number of repetitions of the divide operation is effected by an instruction word which has associated with it a control word containing a count indicating the number of times that the predetermined operation code is to be inserted into the I-Register. The number of quotient characters developed is equal to the number of repetitions of the divide operation, as determined by the control word.

This application is one of several applications covering an entire computer system. Portions of the apparatus herein disclosed are inventions of the following:

Thomas J. Beatson, David E. Keefer, Richard M. Rojko, and John E. Wilhite, as defined by the claims of their application, Ser. No. 446,067, filed Apr. 6, 1965, now Pat. No. 3,368,204, issued Feb. 6, 1968;

Thomas J. Beatson, Frank J. Boyle, Byron F. Burch, Jr., Robert D. Hunter, and Daniel W. Scott as defined by the claims of their application, Ser. No. 448,194, filed Apr. 14, 1965, now Pat. No. 3,366,932, issued Jan. 30, 1968;

Richard A. Boennighausen and Byron F. Burch, Jr., Ser. No. 448,195, filed Apr. 14, 1965, now Pat. No. 3,487,368, issued Dec. 30, 1969;

Robert E. Hunter, Robert A. Perrine, and John E. Wilhite, as defined by the claims of their application, Ser. No. 448,196, filed Apr. 14, 1965, now Pat. No. 3,368,205, issued Feb. 6, 1968;

Edwin W. Herron, Robert D. Hunter, and John E. Wilhite, as defined by the claims of their application, Ser. No. 448,197, filed Apr. 14, 1965, now Pat. No. 3,368,206, issued Feb. 6, 1968;

Frank J. Boyle and John E. Wilhite, as defined by the claims of their application, Ser. No. 448,537, filed Apr. 15, 1965, now Pat. No. 3,413,609, issued Nov. 26, 1968;

Edwin W. Herron, Robert D. Hunter, and David E. Keefer as defined by the claims of their application, Ser. No. 448,538, filed Apr. 15, 1965;

Robert D. Hunter, David E. Keefer, and John E. Wilhite, as defined by the claims of their application, Ser. No. 448,540, filed Apr. 15, 1965, now Pat. No. 3,483,519, issued Dec. 9, 1969; and David E. Keefer, as defined by the claims of his application, Ser. No. 448,541, filed Apr. 15, 1965, now Pat. No. 3,370,275, issued Feb. 20, 1968. All of the above applications are assigned to the assignee of the present application.

DESCRIPTION OF DRAWINGS

The subject matter of the invention is particularly pointed out and distinctly claimed in the concluding portion of the specification. The invention, however, both as to organization and method of operation may best be understood by reference to the following description taken in connection with the accompanying drawings, in which:

FIG. 12 is a block diagram of the data storage elements, the data transfer paths between these elements and the major control elements of the data processing system of FIG. 1.

DATA PROCESSING SYSTEM—GENERAL

Figure 1:
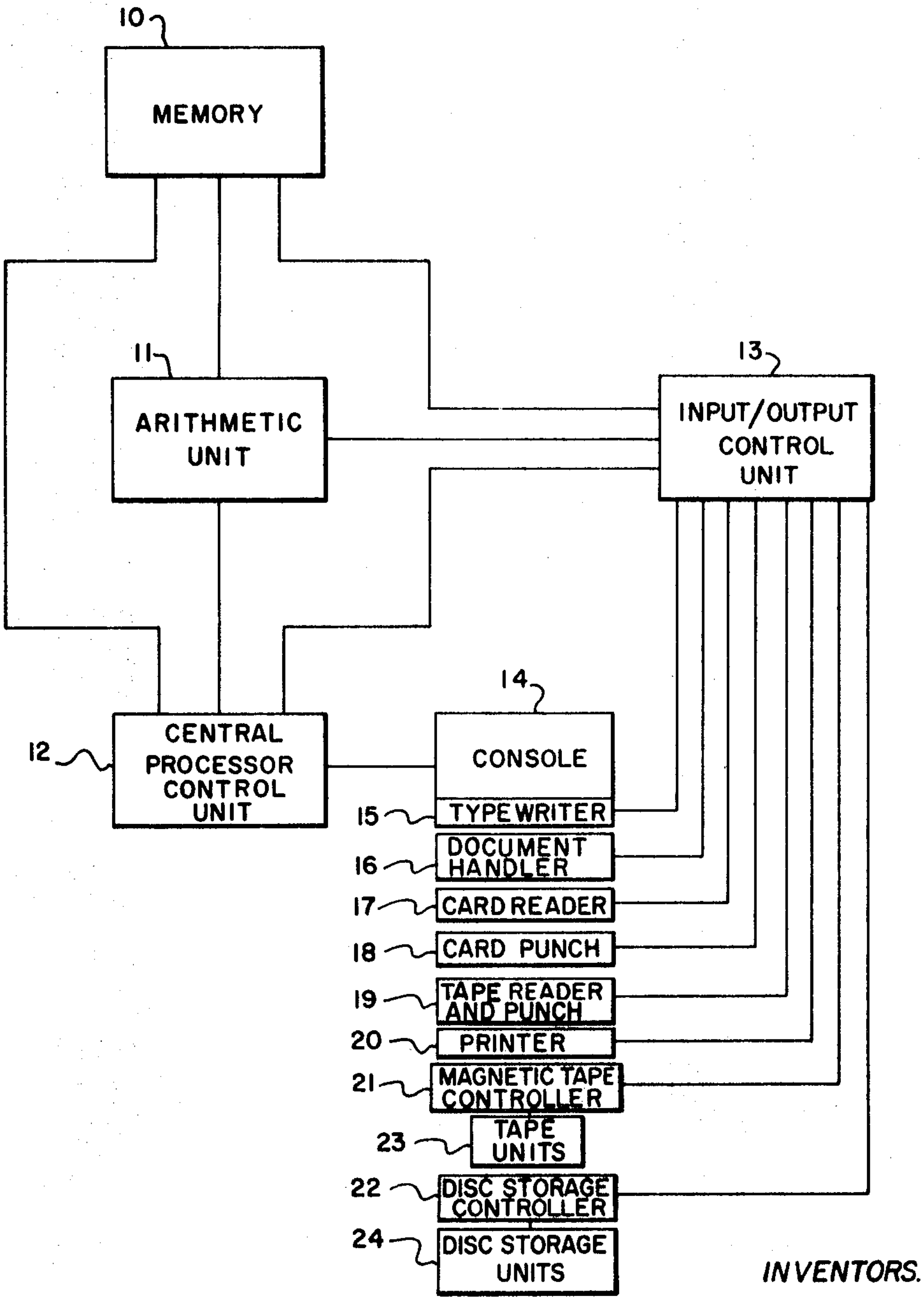
FIG. 1 is a block diagram of the data processing system to which the instant invention is applicable.

With reference to FIG. 1, the illustrated data processing system comprises a Central Processor and a plurality of peripheral subsystems. The major units of the Central Processor are Memory 10, Arithmetic Unit 11, Central Processor Control Unit 12, Input/Output Control Unit 13 and Console 14. In the description, the term Program Processor is applied to the portion of the Central Processor consisting of the Arithmetic Unit 11, the Central Processor Control Unit 12 and the Console 14. The peripheral subsystems which are used with the Central Processor to process data include Typewriter 15 which is associated with Console 14, Document Handler 16, Card Reader 17, Card Punch 18, Perforated Tape Reader/Punch Unit 19, Printer 20, Magnetic Tape Controller 21 and Disc Storage Controller 22. Magnetic Tape Controller 21 can control a plurality of Magnetic Tape Units 23 and Disc Storage Controller 22 can control a plurality of Disc Storage Units 24. Any combination of these peripheral subsystems may be employed with the Central Processor to perform a desired data processing function. The lines interconnecting the various components illustrated in FIG. 1 represent symbolically paths of data and control signals.

The Central Processor responds to a plurality of distinct instructions which are supplied in the sequential order necessary to perform a particular data processing operation. Memory 10 stores data words which are to be processed, data words which are the result of processing, instruction words and auxiliary words for addressing and control. The Accumulator of the Central Processor is also located in Memory 10.

Arithmetic Unit 11 performs binary and decimal arithmetic operations. Central Processor Control Unit 12 controls the sequence of events required for instruction execution in the Central Processor. Arithmetic Unit 11 and Central Processor Control Unit 12, which together comprise the Program Processor, contain the logical elements necessary to access Memory 10 and to perform all operations required for instruction execution. Arithmetic Unit 11 and Central Processor Control Unit 12 communicate with Memory 10 to obtain instruction words, auxiliary words, data words on which operations are to be performed and control signals for synchronizing the Program Processor timing with operations in Memory 10.

Input/Output Control Unit 13 provides for orderly sequencing of data transfers between Memory 10 and the plurality of peripheral subsystems and serves to transmit instructions from the Central Processor to the peripheral subsystems. The Input/Output Control Unit aLso monitors peripheral subsystem operating conditions. Communication between the Central Processor and the various peripheral subsystems occurs through a plurality of channels which are included in the Input/Output Control Unit 13, each channel being associated with one peripheral subsystem.

Console 14, in conjunction with Typewriter 15, permits operator control and communication with the Central Processor. The console includes switches for controlling Central Processor power and program loading, for initiating and halting Central Processor operation and for resetting alert conditions.

For a complete description of the system of FIGS. 1 and 12 and of the present invention which is embodied in such system, U.S. Pat. No. 3,368,205, Hunter et al., issued Feb. 6, 1968, and assigned to the assignee of the present invention is hereby incorporated by reference herein and made a part of the instant application. More particularly, FIGS. 160 and 161 of the drawings and Columns 197 and 198, at about Line 23, beginning with "Instruction 26: Variable Length Divide (VLD)" and continuing on Columns 199 –208, and down to about Line 25 on Column 209, are referred to specifically as being pertinent to the invention claimed herein.

What is claimed as new and desired to be secured by Letters Patent of the United States is:

1. In a data processing system, the combination comprising: first storage means for storing a divisor comprising a plurality of divisor data items, each of said divisor data items comprising a plurality of data entities; an arithmetic Unit; second storage means in said arithmetic unit for storing a dividend comprising a plurality of dividend data items, each of said dividend items comprising a plurality of data entities; third storage means in said arithmetic unit for storing data items; means for transferring successive pairs of data items from said first and said second storage means to said third storage means, each pair of data items comprising a dividend data item and a divisor data item; means included in said arithmetic unit responsive to each pair of data items transferred to said third storage means for developing a corresponding remainder data item; and means included in said arithmetic unit responsive to the pairs of data items transferred to said third storage means for generating a quotient data entity.

2. In a data processing system, the combination comprising: first storage means for storing a divisor comprising a plurality of divisor data items, each of said divisor data items comprising a plurality of data entities; an arithmetic unit; second storage means in said arithmetic unit for storing a dividend comprising a plurality of dividend data items, each of said dividend data items comprising a plurality of data entities; third storage means in said arithmetic unit for storing a plurality of pairs of data items; means for transferring successive pairs of data items from said first and said second storage means to said third storage means, each pair of data items comprising a dividend data item and a divisor data item; means included in said arithmetic unit responsive to the first pair of data items transferred to said third storage means for generating a trial quotient data entity; means responsive to at least one additional pair of data items transferred from said first and said second storage means to said third storage means for generating a signal if said trial quotient data entity is not correct; and means responsive to said signal for correcting said trial quotient data entity.

3. In a data processing system, the combination comprising: first storage means for storing a divisor comprising a plurality of divisor data items, each of said divisor data items comprising a plurality of data entities; an arithmetic unit; second storage means in said arithmetic unit for storing a dividend comprising a plurality of dividend data items, each of said dividend data items comprising a plurality of data entities; third storage means in said arithmetic unit for storing pairs of data items; means for transferring successive pairs of data items from said first and said second storage means to said third storage means, each pair of data items comprising a dividend data item and a divisor data item; means included in said arithmetic unit responsive to the first pair of data items transferred to said third storage means for developing a trial quotient data entity and a first remainder data item; means responsive to at least one additional pair of data entities transferred from said first and said second storage means to said third storage means for producing a corresponding remainder data item and for generating a signal if said trial quotient data entity is not correct; and means responsive to said signal for correcting said trial quotient data entity and for correcting said remainder data items.

4. In a data processing system, the combination comprising: first storage means for storing a divisor comprising a plurality of divisor data items, each of said divisor data items comprising a plurality of data entities; an arithmetic unit; second storage means in said arithmetic unit for storing a dividend comprising a plurality of dividend data items, each of said dividend data items comprising a plurality of data entities; third storage means in said arithmetic unit for storing a plurality of pairs of data items; means for transferring successive pairs of data items from said first and said second storage means to said third storage means, each pair of data items comprising a dividend data item and a divisor data item; means included in said arithmetic unit responsive to the successive pairs of data items transferred to said third storage means for developing a trial quotient data entity and corresponding remainder data items; means for transferring said remainder data items from said arithmetic unit to said second storage means; means included in said arithmetic unit for generating a signal if said trial quotient data entity and said remainder data items are not correct; and means responsive to said signal for correcting said trial quotient data entity and said remainder data items in said second storage means.

5. In a data processing system, the combination comprising: first storage means for storing a divisor comprising a plurality of divisor data items, each of said divisor data items comprising a plurality of data entities; an arithmetic unit; second storage means in said arithmetic unit for storing a dividend comprising a plurality of dividend data items, each of said dividend data items comprising a plurality of data entities; third storage means in said arithmetic unit for storing data items; means for transferring a first divisor data item from said first storage means and a first dividend data item from said second storage means to said third storage means; means included in said arithmetic unit responsive to said first divisor data item and to said first dividend data item for developing a trial quotient data entity and a first remainder data item; means for storing said trial quotient data entity and said first remainder data item; means for transferring a second dividend data item from said second storage means and a second divisor data item from said first storage means to said third storage means; means included in said arithmetic unit responsive to said second dividend and divisor data items and to said first remainder data item for producing a second remainder data item and for generating a signal if correction of said trial quotient data entity and said first and said second remainder data items is required; and means responsive to said signal for correcting said trial quotient data entity and said first and said second remainder data items.

6. In a data processing system, the combination comprising: first storage means for storing a divisor comprising a plurality of divisor data items, each of said divisor data items comprising a plurality of data entities; an arithmetic unit; second storage means in said arithmetic unit for storing a dividend comprising a plurality of dividend data items, each of said dividend data items comprising a plurality of data entities; third storage means in said arithmetic unit for storing data items; means for transferring a first divisor data item from said first storage means and a first dividend data item from said second storage means to said third storage means; means included in said arithmetic unit responsive to said first divisor data item and to said first dividend data item for developing a trial quotient data entity and a first remainder data item; means for storing said trial quotient data entity and said first remainder data item; means for transferring a second dividend data item from said second storage means and a second divisor data item from said first storage means to said third storage means in said arithmetic unit; means included in said arithmetic unit responsive to said second dividend and divisor data items and to said fist remainder data item for producing a second remainder data item and for generating a signal if correction of said trial quotient data entity and said first and said second remainder data items is required; means responsive to said signal for reducing said trial quotient data entity by one to form a final quotient data entity; and means responsive to said signal for adding said first and said second divisor data items to said first and said second remainder data items respectively to form corrected remainder data items.

7. In a data processing system, the combination comprising: first storage means for storing a divisor comprising a plurality of divisor data items, each of said divisor data items comprising a plurality of data entities; an arithmetic unit; second storage means in said arithmetic unit for storing a dividend comprising a plurality of dividend data items, each of said dividend data items comprising a plurality of data entities; third storage means in said arithmetic unit for storing pairs of data items; transfer means for transferring successive pairs of data items from said first and said second storage means to said third storage means, each pair of data items comprising a dividend data item and a divisor data item; means included in said arithmetic unit responsive to the successive pairs of data items transferred from said first and said second storage means to said third storage means for developing a quotient data entity and corresponding remainder data items; means for transferring said remainder data items from said third storage means to said second storage means; first control means for designating a predetermined number of quotient data entities to be generated in said arithmetic unit; and second control means responsive to said first control means for causing said transfer means to repeat the transfer of successive pairs of data items from said first and said second storage means to said third storage means the number of times required to produce the predetermined number of quotient data entities designated by said first control means.